United States Patent Office 3,654,295
Patented Apr. 4, 1972

3,654,295
PROCESS FOR THE PRODUCTION OF
2-HALO-5-NITROTHIAZOLES
Erich Däbritz and Karl Heinrich Mayer, Leverkusen, Germany, assignors to Farbenfabriken Bayer Aktiengesellschaft, Leverkusen, Germany
No Drawing. Filed July 28, 1969, Ser. No. 845,487
Claims priority, application Germany, Aug. 10, 1968, P 17 95 106.3
Int. Cl. C07d 91/32
U.S. Cl. 260—302 R                    2 Claims

ABSTRACT OF THE DISCLOSURE

In the manufacture of a 2-halo-5-nitrothiazole by the diazotisation of 2-amino-5-nitrothiazole with a hydrohalic acid, the reaction is carried out in the absence of a catalyst and in a dilute aqueous solution of the acid, preferably at a temperature of $-10°$ to $10°$ C.

---

Proposals have been made to produce 2-bromo-5-nitrothiazole and 2-chloro-5-nitrothiazole by diazotising 2-amino-5-nitrothiazole and subsequently replacing the diazonium group by halogen. With this exchange of the Sandmeyer type, the diazotisation for the preparation of 2-bromo-5-nitrothiazole is, for example, carried out in a large excess of concentrated hydrobromic acid or alkali bromide/concentrated sulphuric acid, either elementary bromine (cf. J. Craig, J. Amer. Chem. Soc. 56, 231 (1934)) or a copper salt (cf. H.v. Bado u.B. Prijs, Helv. Chim. Acta 33, 306 (1950) as well as 37, 2057 (1955) and 38 (1955)) being added as catalyst. With the addition of bromine, a subsequent treatment with thiosulphate is necessary in order once again to remove excess bromine. The yield of 2-bromo-5-nitrothiazole produced by these processes is given in the literature as about 40%.

In a corresponding manner, 2-chloro-5-nitrothiazole can be obtained by diazotisation of 2-amino-5-nitrothiazole in a mixture of concentrated sulphuric acid and sodium chloride, with the addition of copper sulphate as a catalyst (cf. K. Ganapathi and A. Venkatarman, Proc. Indian Acad. Sci. 22a, 343 (1945); Chem. Abstracts 40 (1946), 4056/8–4061/1, particularly 4059/9). The yield is 55% of the theoretical.

We have now found that 2-halo-5-nitrothiazole can be produced by diazotising 2-amino-5-nitrothiazole in the corresponding hydrohalic acid if the reaction is carried out in the absence of catalytically acting additives and in a highly dilute aqueous solution of the hydrohalic acid.

It must be considered as extremely surprising that the process according to the invention can be conducted without the additives which are usual for reactions of the Sandmeyer type, for example, copper compounds or elementary copper (so-called Gattermann copper) and supplies the required end products with very good yields and in a high degree of purity. For the preparative decomposition of diazonium halides, it is, for example, stated in F. Klages "Lehrbuch der organischen Chemie," 1st volume, 1st half, page 166, Berlin (1952): "However, only with the introduction of iodine does it proceed without particular auxiliaries, whereas the more important chlorination and bromination according to Sandmeyer already necessitates the presence of the corresponding cuprous halides s catalysts."

Individual cases have certainly become known in which the replacement of the diazonium group by chlorine can be effected without adding copper, for example, the obtaining of 3-chloro-pyridine from 3-amino-pyridine (cf. Houben-Weyl: "Methoden der organischen Chemie," 4th edition, Thieme, Stuttgart (1952), vol. V/3, page 852) and the production of 2-chlorotriazole from 2-aminotriazole (cf. J. Thiele and W. Manchot, Liebigs Ann. Chem. 303, 50 (1898)). Here, the diazotisation of the amino compounds is carried out in concentrated hydrochloric acid, which corresponds to the usual working procedure with the decomposition of diazonium halides for the introduction of halogen into the aromatic nucleus, as it is described and recommended in the literature, for example, also with the diazotisation of 2-amino-5-nitrothiazole, which is effected in normal commercial highly concentrated hydrohalic acid, e.g. in 48% hydrobromic acid.

By contrast herewith, the process according to the invention is carried out in highly dilute aqueous hydrohalic acid. Working by this procedure, it was to be expected that the replacement of the diazonium group by chlorine or bromine would result in the saponification of the required end products to the hydroxy compound, since it is known from Helv. Chim. Acta, 33 (1950), page 308, that 2-halo-5-nitrothiazoles are saponified by hydrochloric acid to 2-hydroxy-5-nitrothiazole.

Consequently, it was not to be expected that the reaction would also proceed smoothly in a highly dilute aqueous solution of the hydrohalic acid, and it is an advantage of the process according to the invention that no concentrated hydrohalic acids have to be present for carrying the process into effect.

For carrying out the process, the preferably powdered 2-amino-5-nitrothiazole is taken up in 2.5 to 10 times and advantageously 4 to 7 times the molar quantity of a 10% to 40%, and advantageously, 18 to 36% by weight aqueous hydrobromic acid, or in a 10% to 30%, and advantageously, 15 to 25%, by weight aqueous hydrochloric acid. The diazotisation is effected in a manner which is known in itself by very slow dropwise addition of a concentrated aqueous solution of alkali nitrite in the cold, for example, at from $-10°$ C. to $10°$ C., preferably at from $-5°$ C. to $5°$ C. After diazotisation has taken place, stirring of the mixture is continued at the same temperature for another 30 minutes to 3 hours, depending on the size of the mixture. The cooling means are then removed and stirring is once again continued for 30 minutes to 3 hours, depending on the size of the mixture, so as to complete the reaction.

For the subsequent working-up operation, the mixture is diluted with water and the formed precipitate of 2-halo-5-nitrothiazole is filtered off with suction, being washed with highly dilute (about 2%) aqueous hydrohalic acid and dried. Analytically pure 2-bromo-5-nitrothiazole or 2-chloro-5-nitrothiazole is obtained in a yield of at least 80%.

2-bromo- and 2-chloro-5-nitrothiazoles are for example used for the production of compounds which are effective against amoebae as described in the Dutch patent specification 6.803.731 or in the Belgian patent specification 709,805.

EXAMPLE 1

145 g. (1 mol) of powdered 2-amino-5-nitrothiazole are introduced in portions with good cooling into 1250 cc. of 29% hydrobromic acid. A solution of 207 g. (3 mols) of sodium nitrite in 250 cc. of water is introduced within 4 hours and at $-5°$ C. to $5°$ C. into the resulting suspension. During the dropwise addition of the $NaNO_2$ solution, strong foaming can occur from time to time, and this is eliminated by adding, for example, 30 cc. of amyl alcohol. After completing the addition of nitrite, the solution is kept for half an hour at $0°$ C. and is then stirred for 1½ hours without renewing the refrigerating bath.

After adding 500 cc. of water, the precipitate which has formed is filtered off with suction, washed with dilute HBr (e.g. 25 cc. of HBr to 475 cc. of water) and dried. 166 g. (80% of the theoretical) of 2-bromo-5-nitrothiazole are obtained as a colourless to slightly yellowish substance having the melting point 86 to 88° C.

EXAMPLE 2

If 155 g. (1 mol) of 2-amino-5-nitrothiazole are introduced into 1250 cc. of 20% aqueous hydrobromic acid and if the following procedure is in other respects as in Example 1, it is possible to obtain 178 g. (85% of the theoretical) of 2-bromo-5-nitrothiazole having the melting point 85 to 88° C.

EXAMPLE 3

A solution of 103.5 g. (1.5 mols) of sodium nitrite in 125 cc. of water at —5° C. to 5° C. is added dropwise in 2½ hours to a suspension of 67 g. (0.46 mol) of powdered 2-amino-5-nitrothiazole in 625 cc. of 22% hydrochloric acid. The reaction solution is kept for one hour at 0° C. and is then stirred for 3 hours without a refrigerating bath. The precipitate formed is filtered off under suction after the addition of 250 cc. of water, subsequently washed with 500 cc. of dilute HCl (e.g. 25 cc. of concentrated hydrochloric acid to 475 cc. of water) and finally dried. 60.5 g. (80%) of pure 2-chloro-5-nitrothiazole are obtained.

What we claim is:

1. In the manufacture of a 2-halo-5-nitrothiazole by the diazotisation of 2-amino-5-nitrothiazole with a hydrohalic acid selected from the group of hydrochloric and/or hydrobromic acids, the improvement comprising carrying out said reaction in the absence of a catalyst in a highly dilute aqueous solution of said hydrohalic acid, the concentration of said acid in said solution being in the range of 18 to 36 weight percent where said acid is hydrobromic acid and the concentration of said acid in said solution being in the range of 15 to 25 weight percent where said acid is hydrochloric acid.

2. The process of claim 1 wherein the diazotisation reaction temperature is maintained in the range of —10° to 10° C.

References Cited
UNITED STATES PATENTS 2,030,373    2/1936    Johnson _____ 260—302

ALEX MAZEL, Primary Examiner

R. J. GALLAGHER, Assistant Examiner